Aug. 16, 1955 E. KUHNLE 2,715,353

MOUNTING MEANS FOR OPTICAL PROJECTION SYSTEM FOR WEIGHING SCALES

Filed Dec. 12, 1951 6 Sheets-Sheet 1

INVENTOR.
ERNST KUHNLE
BY
Michael S. Striker
agt

INVENTOR.
ERNST KUHNLE
BY
Michael S. Striker
agt

Aug. 16, 1955 E. KUHNLE 2,715,353

MOUNTING MEANS FOR OPTICAL PROJECTION SYSTEM FOR WEIGHING SCALES

Filed Dec. 12, 1951 6 Sheets-Sheet 3

INVENTOR.
ERNST KUHNLE
BY
Michael S. Striker
Atty

INVENTOR.
ERNST KUHNLE
BY
Agt

INVENTOR.
ERNST KUHNLE
BY
Michael S. Striker
ag

Aug. 16, 1955 E. KUHNLE 2,715,353

MOUNTING MEANS FOR OPTICAL PROJECTION SYSTEM FOR WEIGHING SCALES

Filed Dec. 12, 1951 6 Sheets-Sheet 6

INVENTOR.
ERNST KUHNLE
BY 2,715,353

MOUNTING MEANS FOR OPTICAL PROJECTION SYSTEM FOR WEIGHING SCALES

Ernst Kuhnle, Balingen, Germany

Application December 12, 1951, Serial No. 261,214

Claims priority, application Germany December 18, 1950

4 Claims. (Cl. 88—24)

The present invention relates to a means for guiding an optical system of a weighing scale, for example.

One of the objects of the present invention is to provide a means for mounting an optical system for movement in a predetermined plane so that it may be used to project calibrations located at different parts of a scale, for example.

A further object of the present invention is to provide a guiding means which has no play.

A still further object of the present invention is to provide a means for simultaneously moving all elements of an optical system located along a predetermined optical axis.

An additional object of the present invention is to provide a guiding apparatus of the above type which is made up of a few simple parts and which is very reliable in operation.

With the above objects in view, the present invention mainly consists of an apparatus for guiding the optical system of a weighing scale, for example. This apparatus includes a stationary elongated cylindrical bar member having a polished exterior surface. A plate member is located adjacent to the bar member and has rotatably mounted thereon a pair of rollers which respectively engage the cylindrical bar member at opposite sides thereof. The elements of the optical system are respectively mounted on arms which are interconnected by a common cross member, and one of these arms is pivotally connected to the plate member at a point located in the optical axis. A spring interconnects this one arm with the plate member so as to tend to turn the latter about an axis transverse to the cylindrical bar member and in this way urge the rollers against the bar member so as to eliminate any play in the guiding apparatus. The cross member common to the above-mentioned arms is pivotally supported on a support member for turning movement about an axis parallel to the optical axis, and this support member is itself pivotally mounted for turning movement about an axis parallel to the optical axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
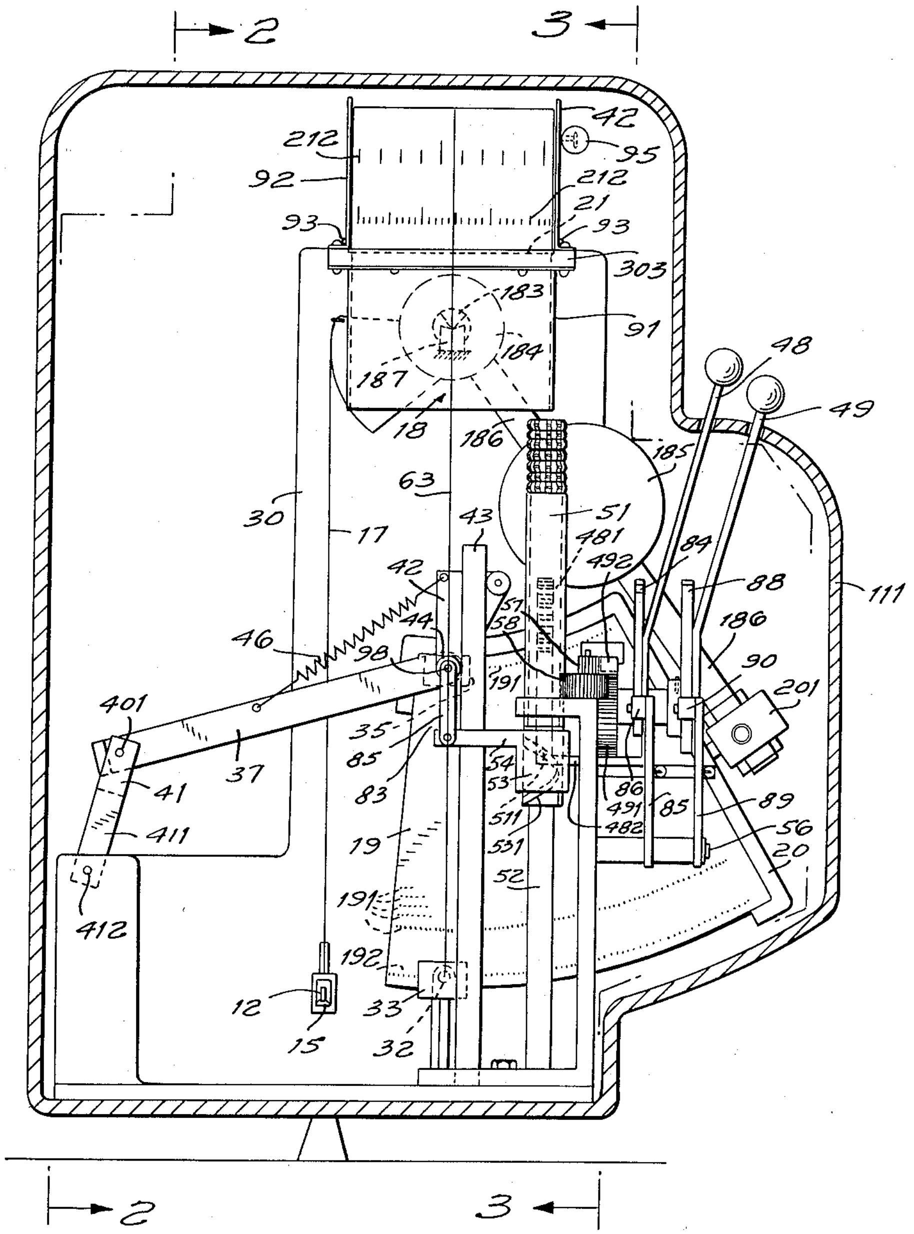
Fig. 1 is a diagrammatic, sectional view taken along line 1—1 of Fig. 2 in the direction of the arrows and showing a weighing scale embodying parts of the present invention.
Figure 2:
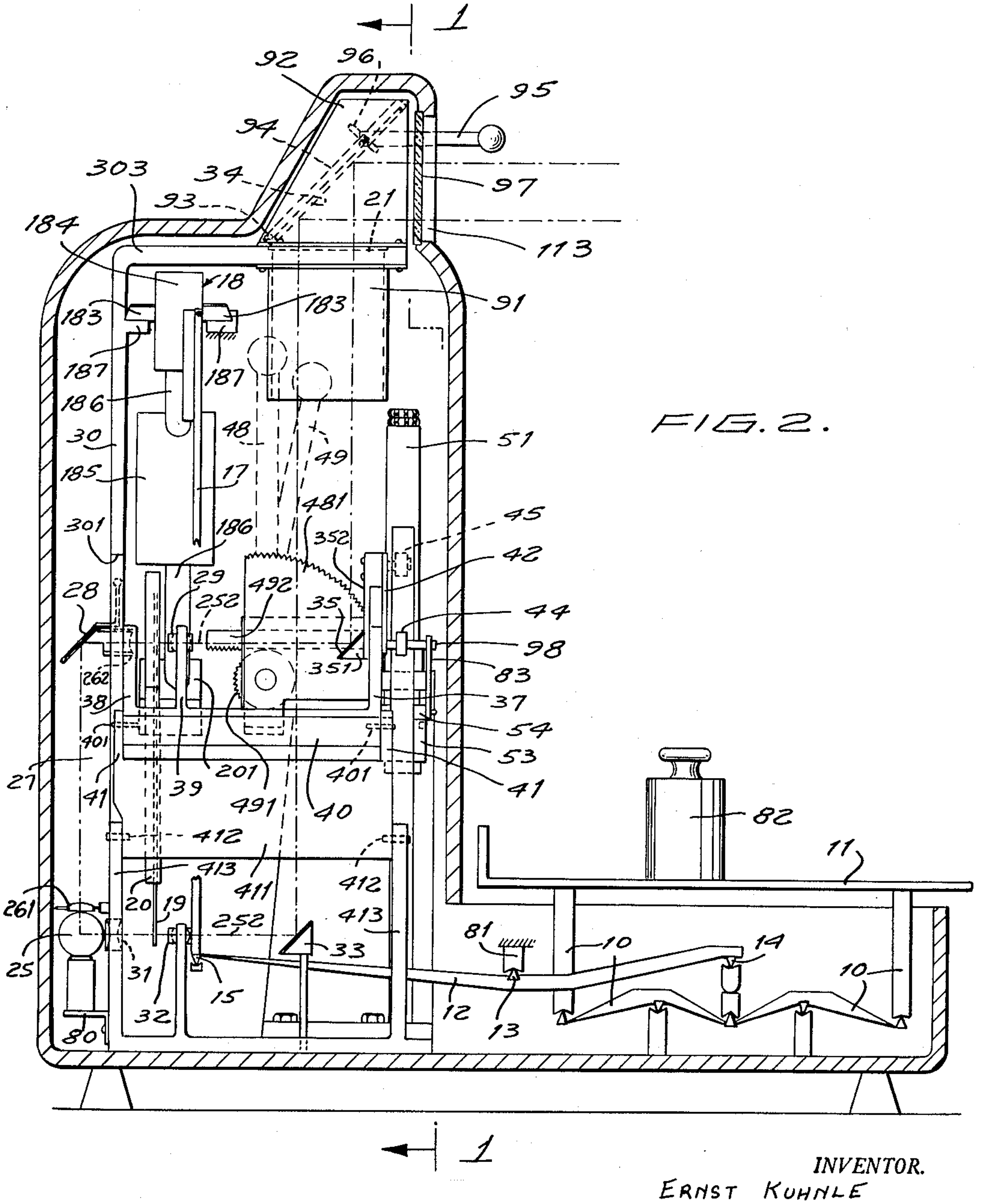
Fig. 2 is a diagrammatic, sectional view taken along line 2—2 of Fig. 1 in the direction of the arrows.
Figure 3:
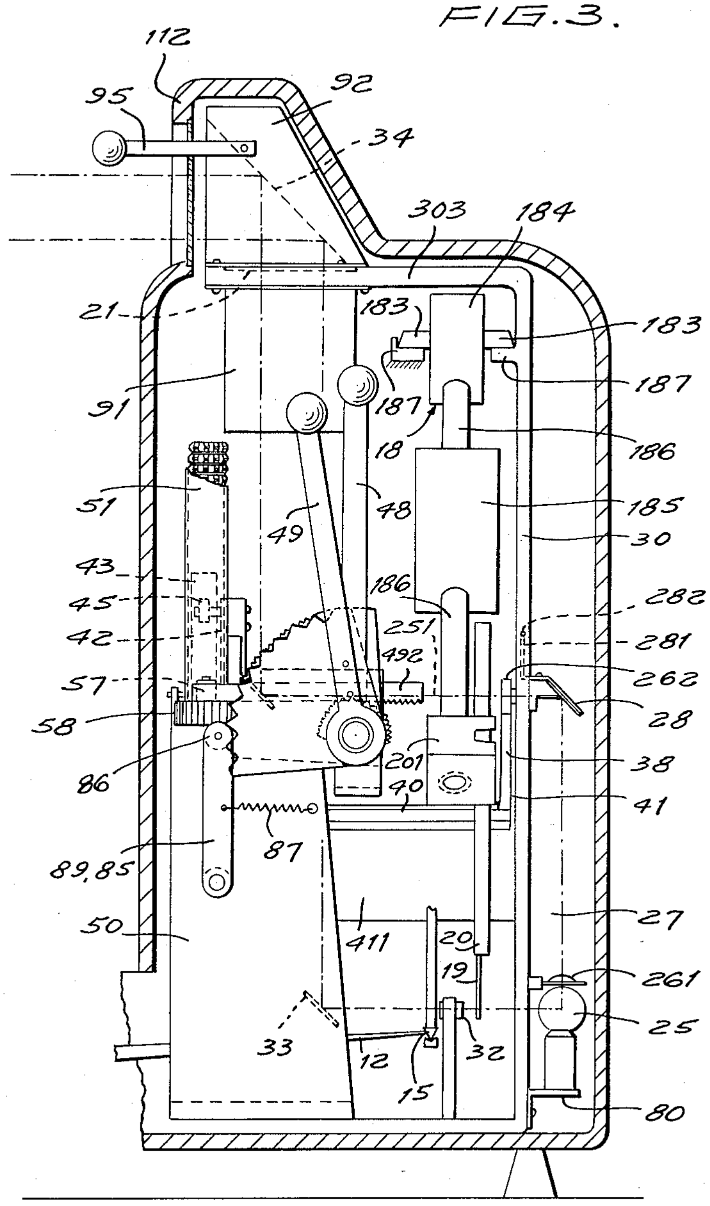
Fig. 3 is a diagrammatic, fragmentary, sectional view taken along line 3—3 of Fig. 1 in the direction of the arrows.

Referring now to the drawings, and particularly to Figs. 1–3, there is shown (Fig. 2) a pan 11 to receive the material to be weighed, this pan acting through diagrammatically illustrated transmission members 10 on the diagrammatically illustrated central weighing beam 12 of the weighing mechanism. This beam 12 has an upwardly directed knife edge 13 mounted thereon and engaging the diagrammatically illustrated bearing 81. The weight 82 resting on the pan 11 works through the medium of members 10 on the knife edge 14 mounted on the right-hand lever arm of beam 12, as viewed in Fig. 2, and lowers the knife edge 15 mounted on the longer, left-hand lever arm of beam 12. The diagrammatically illustrated knife edge 15 of beam 12 acts on a band 17 to actuate the tilting mechanism 18 which is diagrammatically illustrated in Figs. 1–3. This tilting mechanism 18 is provided with a knife edge 183 supported in a bearing 187 which is stationary. The drum 184 which is fixed to and concentric with the knife edge 183 carries a radial arm 186 upon which a tilting weight 185 is mounted.

Adjacent an end of arm 186 there is mounted a frame 20 of a diapositive plate 19, this frame 20 being fixed to arm 186 by any suitable means such as the clamp 201, diagrammatically illustrated in Figs. 1 and 3. This mounting of plate 19 causes it to turn about the axis formed by knife edge 183 by a distance corresponding to the magnitude of the weight placed on the pan 11.

The diapositive plate 19 carries a large number of rows of calibrations 191 and 192, these rows each being concentric with the axis formed by knife edge 183. Portions of the scales 191 and 192 are projected through a ground glass plate 21 by light passing through the diapositive plate 19 at predetermined points. The diapositive plate 19 is adapted to have a pair of light beams 251 and 252 pass therethrough, the light beam 252 passing through the weight calibrations 192 and the light beam 251, which is vertically adjustable, passing through one of the several concentric rows of price calibrations 191. Both of the light beams 251 and 252 are projected through the ground glass plate 21 so as to simultaneously form two images, one of which indicates weight and the other of which indicates price, on the mirror 34, so that these images may be read. The weight calibrations 192 is located furthest away from the turning axis 183 of the diapositive 19 and has the stationary light beam 252 continually passing therethrough. The concentric rows 191, of price calibrations, mounted on the diapositive 19 are arranged to indicate the total price of a weight of material having a given price per unit of weight.

The projection system includes a stationary light bulb 25 mounted on a stationary support 80 that is itself fixed to the rear side of a stationary wall 30 located within the scale. The light issuing from the bulb 25, which may be connected to any suitable source of current (not shown), passes through a condenser 31 mounted in the wall 30, through the diapositive 19 in the region of the row of calibrations 192, through an objective 32, and onto a mirror 33 from where the light beam passes onto the ground glass plate 21. The latter is located in a cut-out of the arm 303 extending from wall 30. On the lower side of ground glass plate 21, a light guiding tube 91 (Fig. 5) is fixedly connected to the arm 303. On the other side of the ground glass plate 21 there are located two side walls 92 between which is located a frame 94 of a mirror 34, this frame being pivotally mounted on the side walls 92 by means of the pin members 93 extending from the frame 92 and through openings in the side walls 92, respectively. The frame 94 and mirror 34 therewith are thereby mounted for turning movement about an axis parallel to the ground glass plate 21.

Figure 5:
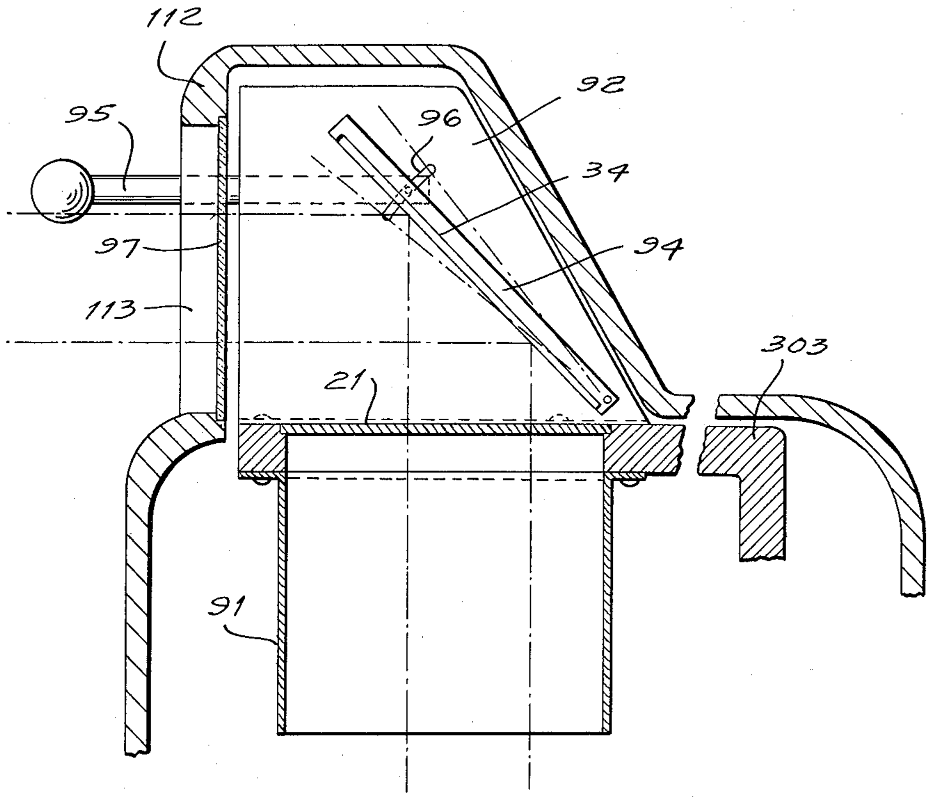
Fig. 5 is a fragmentary, partly sectional view of another part of the structure of the present invention.
Figure 10:
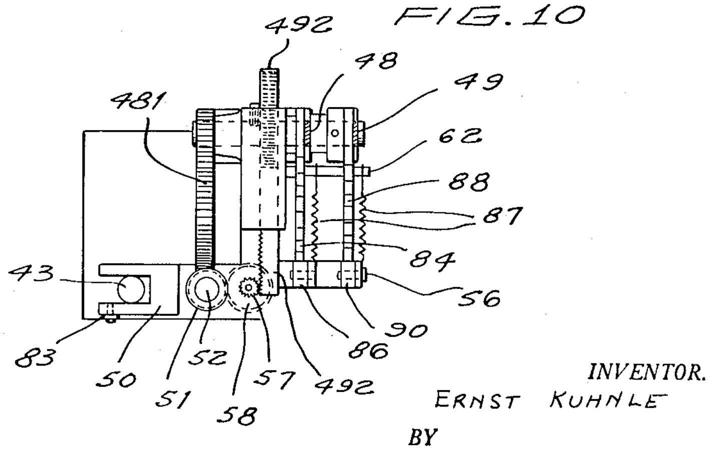
Fig. 10 is a plan view of the structure shown in Figs. 6–9.

One of the side walls 92 is formed with an arcuate slot 96, as shown in Fig. 5, the center of curvature of this slot being located in the pivotal axis of mirror 34. A pin is fixed to the frame 94 and extends through the slot 96. On the other side of the slot 96 from mirror 34 there is located a moving member 95 which is fixed to the pin extending through slot 96. This moving member 95 extends slidably through a bore formed in a front wall portion of the upper housing part 112 of the scale. As is shown in the drawings, the moving member 95 carries a handle at its outer end so that it may be easily moved to adjust the inclination of mirror 34, so that the same may be easily seen by persons of different heights.

The upper housing portion 112 is formed on its front wall with an opening 113 in which the transparent glass 97 is mounted, as shown in Fig. 5, so that the mirror 34 is clearly visible to the viewer. The housing portion 112, together with the side limiting walls 92, the bottom wall 21 of ground glass, and the front transparent wall 97 forms a substantially closed chamber in which the light beams travel.

In addition to the above-described light beam 252 issuing from bulb 25, there issues from bulb 25 a second light beam 251 which travels upwardly from the light bulb 25 through the bottom central opening of a light-guiding passage 27 located at the rear side of the wall 30. In this lower central opening of light guide 27 there is located a first condenser lens 261. The light beam 251 passing through the lens 261 reaches the mirror 28 from where it is projected through a slot 301 formed in the wall 30, as is most clearly shown in Fig. 4 of the drawings. The light beam 251 passes from the mirror 28 through a second condenser lens 262, which together with condenser lens 261 forms a complete condenser. This condenser lens 262 is mounted for movement along the length of slot 301 together with mirror 28, as will be more fully described below, and the light beam passing through lens 262 then continues through the diapositive plate 19. It is thus apparent that, in accordance with the adjusted vertical position of mirror 28 and condenser lens 262, the light beam 251 will pass through one of the several rows of price calibrations located on the diapositive 19. The image of that portion of the diapositive 19 through which the light beam 251 passes is projected through an objective 29 which is mounted for vertical movement together with mirror 28 and lens 262. The image from the objective 29 is projected onto a mirror 35 which also is mounted for vertical movement together with the mirror 28, lens 262 and objective 29.

In order to maintain the light beam within the vertical plane including the optical axis passing through parts 262 and 29, the mirrors 38 and 35 must be maintained parallel to each other. The mirror 28 is, for this purpose, mounted for vertical movement by means of an arm 281 extending from the frame of mirror 28 and a guide piece 282 slidably engaging the slot 301 in the wall 30 and being fixed to arm 281. A portion of this mirror frame extends through the slot 301 and is connected to a portion of the outer casing located about lens 262, the latter being mounted for rotation with respect to this casing portion and mirror 28 therewith.

The mirror 35 is completely independent of the other parts of the optical system and is mounted on a mirror holder 351 which is fixed to an arm 352 that is fastened directly to guide plate 42 to be described below, the parts 352 and 42 being parallel to each other. The image of the portion of diapositive 19 through which light beam 251 passes is projected from mirror 35 to the ground glass plate 21 and onto the mirror 34 from which it may be seen.

Figure 4:
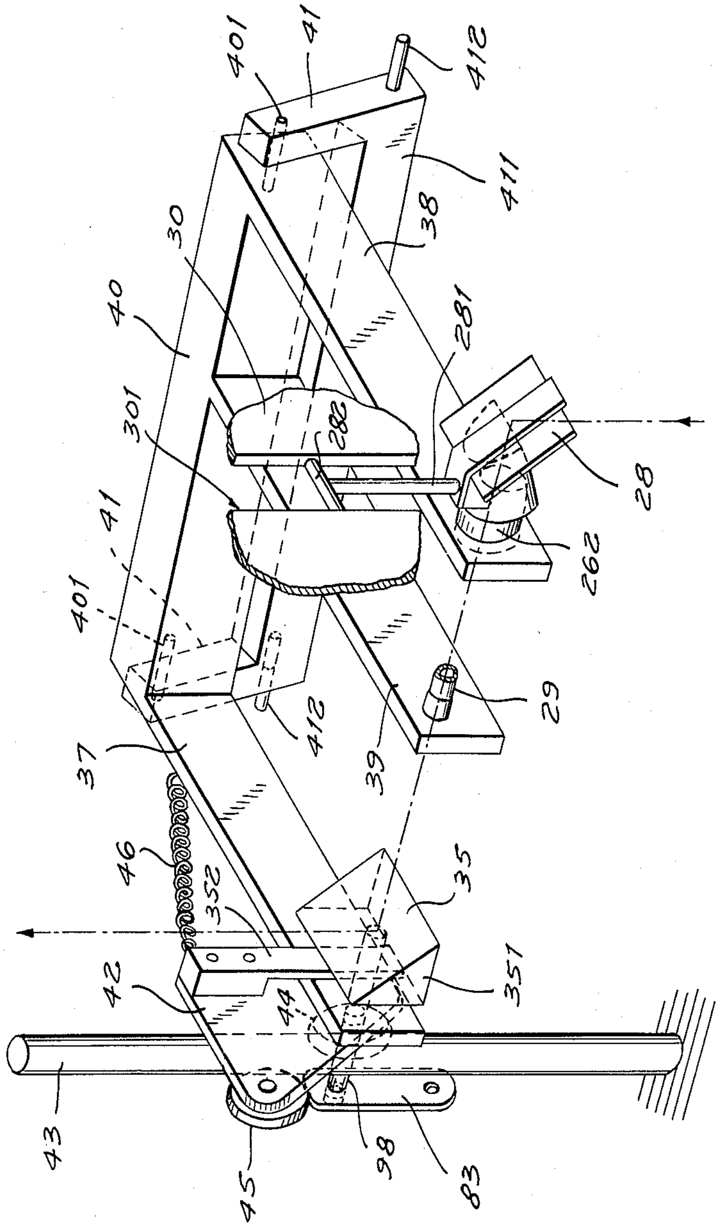
Fig. 4 is a schematic perspective view of part of the structure of the present invention.

All parts of the vertically adjustable optical system, except part 35, that is, parts 28, 262 and 29 are mounted on the ends of arms 38 and 39, the objective 29 being mounted adjacent a free end of arm 39 and the lens 262, to which mirror 28 is connected, being mounted adjacent a free end of arm 38, as is most clearly shown in Fig. 4. These arms 38 and 39 together with a guide arm 37 are interconnected by a common cross member 40. The cross member 40 is pivotally mounted at its opposite ends, by means of pins 401, in the extensions 41 which are joined by a cross bar 411 that is itself pivotally mounted at 412 on the columns 413 which are stationary in the scale housing. The pivotal axes formed by members 401 and 412 are parallel to each other and to the optical axis of parts 29 and 262.

The free end of arm 37 is pivotally connected to guide plate 42 which is mounted for vertical movement along a stationary, cylindrical guide bar 43, which preferably has an outer smooth, polished surface, the vertical movement of plate 42 causing turning movement of arms 37, 38 and 39. The arm 37 is pivotally connected to plate 42 by means of a pivot pin 98, shown in Fig. 1, the axis of this pivot pin coinciding with the optical axis of the vertically movable optical system.

The plate 42, in the example illustrated in Fig. 4, is triangular and carries, adjacent its lower corner, a guiding roller 44 and, at one of its upper corners, a guiding roller 45, these guiding rollers contacting the bar 43 at diametrically opposite sides thereof. A spring 46 extends between arm 37 and the third corner of triangular plate 42 so as to tend to turn plate 42 about an axis transverse to bar 43 and in this way urge rollers 44 and 45 into engagement with bar 43, so as to eliminate all play between rollers 44 and 45 and bar 43.

In accordance with the vertical location of the optical system shown in Fig. 4, there will be projected upon the mirror 34 an image of a particular one of the price scales 191, and it is therefore necessary to provide a means for properly locating the vertically movable optical apparatus so that the beam 251 passes through that scale 191 which corresponds to the price per unit weight of the material to be weighed. This is brought about by the following structure:

On one side of the weighing scale, there are located a pair of levers 48 and 49 which are mounted in the housing portion 111 for turning movement about a single axis. A gear sector 481 is fixedly connected to the lever 48 through the medium of an interconnecting member 482 (Figs. 7 and 9) so that this gear sector is mounted for turning movement together with lever 48, the gear sector 481 having its center coinciding with the pivotal axis of lever 48. The teeth of gear sector 481 mesh with an especially constructed spindle 51 so that upon turning movement of lever 48 and sector 481 the hollow spindle 51 will be moved vertically on the stationary cylindrical bar 52 upon which the spindle 51 is mounted for free sliding movement.

As is most clearly shown in Fig. 1, the spindle 51 is formed with a plurality of annular teeth at all except the lowermost portion thereof so as to form a rack which meshes with gear sector 481. Located about this lowermost portion of spindle 51, which does not have annular teeth formed thereon, is a sleeve 53 to which is fixedly connected an arm 54. This arm 54 is connected to the lower end of a strap 83 which is connected at its upper end to pin 98 which extends from the holding member formed by plate 42. The sleeve 53 moves together with the spindle 51 in a vertical direction along post 52 upon turning of lever 48 and sector 481 therewith, so that the guide plate 42 is also vertically moved and in this way the optical system shown in Fig. 4 is moved vertically.

By means of the above described structure, it is possible to turn the lever 48 so as to roughly locate the vertically movable optical system at a desired location along diapositive 19. In a preferred embodiment of the invention the lever 48 is used to move the optical system shown in Fig. 4 to locations corresponding to even values per unit of weight, such as, for example to even dollar or to even ten cent values per unit of weight.

Figures 6, 7, 8, 9:
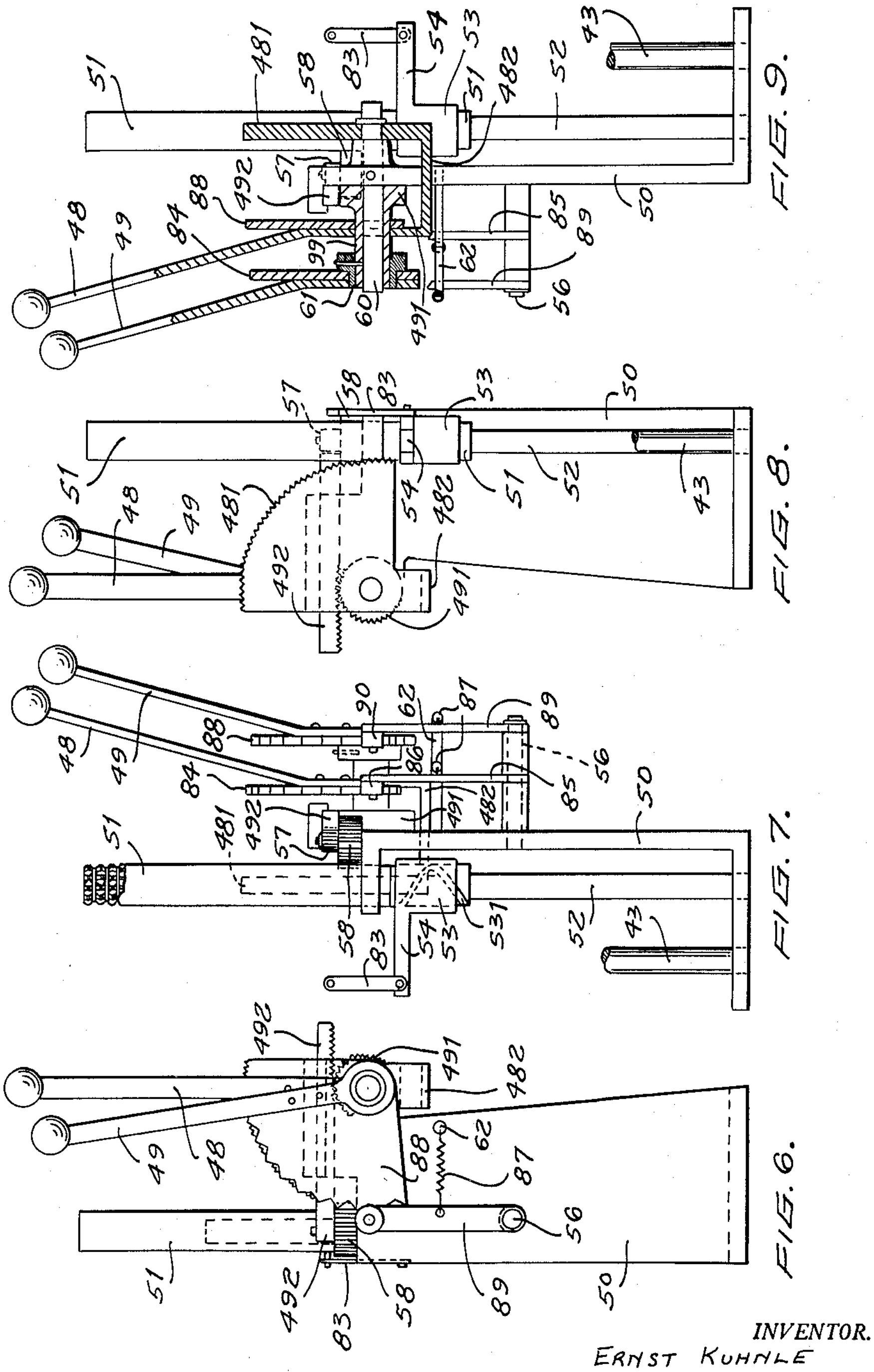
Fig. 6 is an elevational view of still another part of the apparatus of the present invention.
Fig. 7 is a side view of the structure shown in Fig. 6.
Fig. 8 is a view of the structure of Fig. 6 shown from the rear side thereof.
Fig. 9 is a partly sectional view illustrating the details of the structure of Figs. 6–8.

The lever 48 has fixedly connected thereto a substantially arcuate plate 84 formed with a plurality of indentations in the outer periphery thereof. An arm 85 is mounted for turning movement on a pin 56 extending from stationary support 50, and this arm 85 has its upper end urged toward plate 84 by a spring 87 extending between arm 85 and a pin 62 fixedly mounted on support 50. The upper end of arm 85, as is shown in Fig. 7, carries a roller 86 which engages one of the regularly formed indentations of plate 84. The indentations of plate 84 are designed so as to always locate lever 48 at a position which corresponds to an even value per unit of weight, as was described above. Thus the operator upon turning of lever 48 can feel the roller 86 moving into one of the indentations of plate 84, and when the lever 48 is idle the roller 86 is always located in one of these indentations. The parts are so designed that as the roller 86 moves from one indentation on plate 84 to the next, the optical system shown in Fig. 4 moves through a vertical distance corresponding to the vertical space between ten of the rows of scales 191. Thus, by turning lever 48 the operator may quickly locate the optical system at one of the scales 191 corresponding to an even dollar or ten cent value per unit of weight.

The lever 49 is provided in order to move the optical system to one of the scales located between every tenth scale 191 corresponding to an even ten cent value, for example. This lever 49 has fixedly connected thereto a toothed disc 491 which meshes with a horizontally slidable rack 492, the latter meshing with the gear 57 to which is joined the gear 58 so as to rotate these latter gears 57 and 58.

In addition to being formed with annular teeth, as was described above, the spindle 51 is also formed with longitudinal teeth intersecting the annular teeth so that spindle 51, in addition to being in the form of a rack vertically movable along bar 52 by meshing of the annular teeth of member 51 with the gear sector 481, is also in the form of a gear rotatable about the cylindrical bar 52 as a result of the meshing of the longitudinal gear teeth formed in spindle 51 with the gear 58. The gears 57 and 58 are rotatably mounted on the stationary support 50.

As is apparent from Figs. 1 and 7, the lower portion of spindle 51 is formed with a helical groove 531, and a pin 511 (Fig. 1), fixed to the inner surface of sleeve 53, extends into this helical groove 531. The sleeve 53, by virtue of its connection to plate 42, can only move vertically. The turning movement imparted to spindle 51 by lever 49 thus causes the spindle to rotate about the bar 52 and within sleeve 53. Thus, the helical groove 531 moves with respect to pin 511 and causes the sleeve 53 to move vertically with respect to spindle 51 and in this way move the optical apparatus of Fig. 4 to locate the same in line with a desired scale 191. It should be noted that during rotation of spindle 51, upon turning of gear 58, the spindle 51 does not move vertically as a result of the meshing of the annular teeth of spindle 51 with gear sector 481, these annular teeth simply turning in the teeth of stationary gear sector 481 during actuation of lever 49, and during vertical movement of spindle 51 the gear teeth thereof simply slide between the teeth of gear 58.

It is believed apparent that the movement of lever 49 provides a much finer adjustment of plate 42 and the parts connected thereto than does the lever 48. A plate 88, provided with indentations thereon in the same way as plate 84, is fixedly connected to lever 49 for turning movement therewith in exactly the same way as plate 84 is connected to lever 48, and a spring urged lever 89 pivotally mounted on pin 56 carries a roller 90 for engagement with one of the indentations on plate 88 so that the lever 49 may be easily located at a position which corresponds to the accurate location of the optical system of Fig. 4 in line with one of the scales 191. The parts are so designed that lever 49 causes a vertical movement of the optical system which is one tenth of that caused by a corresponding movement of lever 48.

When a certain material is to be weighed with the above described apparatus, the price per unit of weight of this material is set into the apparatus by means of levers 48 and 49. The lever 48 may be used to set in the tenth of a dollar value of the unit weight of the material, for example, and the lever 49 is used to set in the hundredth of a dollar value of the unit weight. Suitable calibrations may be provided on the exterior of housing portion 111 adjacent to the levers 48 and 49 to indicate the proper location thereof. When the price per unit weight is set into the apparatus and the material to be weighed is placed on the pan 11, the diapositive plate 19 turns about the knife edge axis 183 of the tilting system 18 in accordance with the magnitude of the weight of the material on pan 11. The weight scale 192 and that one of the price scales 191 corresponding to the price per unit weight of the material being weighed are thereby turned through the light beams 251 and 252 and appear on the mirror 34. The ground glass plate 21 includes a central marking line which also appears on the mirror 34, as is shown in Fig. 1, so that one portion of this line accurately indicates the weight in accordance with the intersection of this marking line and the scale 192, and another portion of the marking line indicates the price of the material being weighed in accordance with the intersection of the line and the particular scale 191 appearing on mirror 34.

If desired, color filters may be provided in the optical system so that the different scales appear in different colors. It should be noted that it is not necessary to first set in the price per unit weight by levers 48 and 49 and then place the material on the pan 11. The material may be first placed on pan 11 and the price then set into apparatus. It should also be noted that with the above-described construction it is immaterial whether the lever 48 or 49 is moved first. The above-described chamber formed by housing portion 112, side plates 92, and ground glass plate 21, is particularly advantageous because the plate 21 always remains substantially in the dark and outside light cannot get at the plate 21. The mirror 34 produces equally good images either in bright sunshine or in dim light.

It will be understood that each of the elements described above, or two or more together, may also find a useful application in other types of guiding apparatus for adjustably mounting an optical system differing from the types described above.

While the invention has been illustrated and described as embodied in guiding apparatus for adjustably mounting an optical system of a weighing scale, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. In a weighing scale, mounting means for an optical projection system, comprising in combination, a stationary bar member; means supporting said stationary bar member with one end thereof higher than the opposite end thereof; a holding member connected to the optical system and located adjacent to said bar member; a pair of rollers rotatably mounted on said holding member and respectively engaging opposite sides of said bar member so as to guide said holding member and optical system therewith for movement along said bar member; spring means operatively connected to said holding member for tending to turn the same about an axis transverse said bar member so as to urge said rollers against said bar member; and a diapositive carrying weighing scale indicia and positioned in the scale to have a portion of the diapositive projected by the optical system, the latter being movable with said holding member to locate said optical system in a desired position with respect to said diapositive.

2. In a weighing scale, mounting means for an optical projection system having elements located along an optical axis, comprising in combination, an elongated stationary bar member normal to and intersecting the optical axis; means supporting said stationary bar member with one end thereof higher than the opposite end thereof; a holding member mounted for movement along said bar member; a plurality of arms supporting parts of the optical system, said arms being connected to a common cross member and one of said arms being pivotally connected to said holding member at a point along the optical axis; a support member pivotally connected to said cross member to support the same for turning movement about a first axis parallel to the optical axis; a mounting means pivotally supporting said support member for turning movement about a second axis parallel to said first axis; and a diapositive carrying weighing scale indicia and positioned in the scale to have a portion of the diapositive projected by the optical system, the movement of said holding member along said bar member orienting the optical system with respect to said diapositive.

3. Mounting means for an optical projection system having elements located along an optical axis, comprising in combination, an elongated stationary bar member normal to and intersecting the optical axis; a plate member mounted for movement along said bar member; a plurality of arms supporting parts of the optical system, said arms being connected to a common cross member and one of said arms being pivotally connected to said plate member at a point along the optical axis; a support member pivotally connected to said cross member to support the same for turning movement about a first axis parallel to the optical axis; a mounting means pivotally supporting said support member for turning movement about a second axis parallel to said first axis; a pair of rollers rotatably mounted on said plate member and respectively engaging said bar member at opposite sides thereof; and spring means interconnecting said one arm with said plate member for urging said rollers against said bar member.

4. Mounting means for an optical projection system having elements located along an optical axis, comprising in combination, an elongated stationary, cylindrical bar member having a polished outer surface and being normal to and intersecting the optical axis; a plate member mounted for movement along said bar member; a plurality of arms supporting parts of the optical system, said arms being connected to a common cross member and one of said arms being pivotally connected to said plate member at a point along the optical axis; a support member pivotally connected to said cross member to support the same for turning movement about a first axis parallel to the optical axis; a mounting means pivotally supporting said support member for turning movement about a second axis parallel to said first axis; a pair of rollers rotatably mounted on said plate member and respectively engaging said bar member at opposite sides thereof; and spring means interconnecting said one arm with said plate member for urging said rollers against said bar member.

References Cited in the file of this patent

UNITED STATES PATENTS

| | | |
|---|---|---|
| 1,204,425 | Gall | Nov. 14, 1916 |
| 1,357,731 | Schaper | Nov. 2, 1920 |
| 1,624,667 | Kern | Apr. 12, 1927 |
| 1,721,398 | Jacob | July 16, 1929 |
| 1,882,774 | Carroll | Oct. 18, 1932 |
| 1,974,654 | May | Sept. 25, 1934 |
| 2,321,346 | Williams | June 8, 1943 |
| 2,335,200 | Sullivan | Nov. 23, 1943 |